(12) United States Patent
Nakayama et al.

(10) Patent No.: US 6,803,148 B2
(45) Date of Patent: Oct. 12, 2004

(54) NICKEL POSITIVE ELECTRODE PLATE AND AKALINE STORAGE BATTERY

(75) Inventors: Soryu Nakayama, Atsugi (JP); Kohji Yuasa, Chigasaki (JP); Hideo Kaiya, Moriguchi (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 147 days.

(21) Appl. No.: 09/980,937

(22) PCT Filed: Apr. 3, 2001

(86) PCT No.: PCT/JP01/02907
§ 371 (c)(1),
(2), (4) Date: Dec. 4, 2001

(87) PCT Pub. No.: WO01/75993
PCT Pub. Date: Oct. 11, 2001

(65) Prior Publication Data
US 2002/0184743 A1 Dec. 12, 2002

(30) Foreign Application Priority Data

Apr. 4, 2000 (JP) ........................................ 2000-101943
Mar. 30, 2001 (JP) ........................................ 2001-101155

(51) Int. Cl.[7] .............................................. H01M 4/50
(52) U.S. Cl. .................... 429/223; 429/224; 429/232
(58) Field of Search ................................ 429/223, 224, 429/232, 206; 29/623.1

(56) References Cited

U.S. PATENT DOCUMENTS

| 5,508,121 A | | 4/1996 | Sawa | |
| 6,548,210 B1 | * | 4/2003 | Shinyama et al. | 429/223 |
| 6,613,107 B2 | * | 9/2003 | Tamagawa et al. | 29/623.5 |

FOREIGN PATENT DOCUMENTS

| JP | 62115657 A | 5/1987 |
| JP | 05047380 A | 2/1993 |
| JP | 05121073 A | 5/1993 |
| JP | 08255628 A | 10/1996 |
| JP | 08315810 A | 11/1996 |
| JP | 09199119 A | 7/1997 |
| JP | 10214619 A | 8/1998 |

* cited by examiner

Primary Examiner—Carol Chaney
(74) Attorney, Agent, or Firm—Akin Gump Strauss Hauer & Feld, L.L.P.

(57) ABSTRACT

In order to provide a nickel-metal hydride storage battery capable of preventing the formation of a minute chemical short circuit between the positive and negative electrodes while exhibiting an excellent self-discharge resistance, a nickel positive electrode plate is formed by filling an active material mainly composed of a hydroxide of nickel into a porous sintered nickel substrate, followed by further forming a layer of a manganese compound containing manganese with a valence of 2 or more on the surface thereof, and an alkaline storage battery is configured by using this nickel positive electrode plate.

7 Claims, 2 Drawing Sheets

NICKEL POSITIVE ELECTRODE PLATE AND AKALINE STORAGE BATTERY

TECHNICAL FIELD

The present invention relates to an alkaline storage battery, a nickel positive electrode plate for use in an alkaline storage battery and the methods for producing the same.

BACKGROUND ART

As an environmentally friendly battery exhibiting high energy density, high output and the like, the sealed nickel-metal hydride storage battery has been widely used for the power sources of cordless equipment such as communications equipment and personal computers, and electronic equipment. The nickel-metal hydride storage battery has also been applied to power tools, electric vehicles and the like, each of which requires large current charge and discharge.

A nickel-metal hydride storage battery is obtained by laminating a nickel positive electrode containing nickel hydroxide as the active material and a negative electrode comprising a hydrogen storage alloy containing hydrogen as the active material, with an alkali-proof separator interposed therebetween, and impregnating the laminated body thus obtained with an approximately 7 to 8 N alkaline electrolyte, followed by sealing.

Such a nickel-metal hydride storage battery generally has a drawback of having a relatively high self-discharge rate as compared with a nickel-cadmium storage battery. One factor in accelerating the decomposition rate of the positive electrode active material is believed to lie in that hydrogen reduces the positive electrode active material. In the case of a nickel-metal hydride storage battery using a negative electrode comprising a hydrogen storage alloy, the partial pressure of hydrogen is always present in the battery, inducing a self-discharge reaction in which hydrogen reduces the positive electrode active material to discharge the same.

Moreover, nickel hydroxide as the active material has a relatively low electronic conductivity. For this reason, in order to suppress a decrease in working voltage during discharging, while maintaining a high utilization of the positive electrode active material at a high temperature, cobalt hydroxide, which is a highly conductive substance, is added in the positive electrode. In a nickel-metal hydride storage battery configured by using such a positive electrode, cobalt hydroxide in the positive electrode is charged during charging to be converted into β-CoOOH, which functions as a conductive agent. This β-CoOOH is stable because it does not change during a normal charging and discharging and has a low solubility. It is, however, converted into cobalt hydroxide having a high solubility, when the battery is allowed to stand for a long period without applying any load thereto until the battery voltage reaches approximately 1.0 V or less. Additionally, when the battery is used for a power tool, electric vehicle and the like, a large current discharge is carried out, so that the positive electrode is partially overdischarged, converting the β-CoOOH into cobalt hydroxide. The reduced cobalt, particularly the cobalt on the surface of the positive electrode is caused to migrate to the separator. When the battery is recharged in such a state, a cobalt ion in the separator that is in contact with the surfaces of the positive and negative electrodes is oxidized to form a minute conductive network between the positive and negative electrodes (hereinafter referred to as "a minute chemical short circuit"), resulting in a problem of inducing the self-discharge of the battery.

With the well-known modifications as described above, the self-discharge of the nickel-metal hydride storage battery can be suppressed to some extent; however, such effect is insufficient, and no effective method has been found for specifically preventing the formation of the minute chemical short circuit.

Meanwhile, the following methods for suppressing the self-discharge have hitherto been proposed: a sulfonation treatment of the separator (Japanese Unexamined Patent Publication No. sho 62-115657); a sulfonation treatment of the surface of the negative electrode (Japanese Unexamined Patent Publication No. hei 8-315810); the addition of a manganese compound in the positive electrode (Japanese Unexamined Patent Publication No. hei 5-121073); and the like. In addition, for suppressing the deterioration of the battery capacity both after storage and standing for a long period, it has been proposed to place inside the battery, a microcapsule obtained by sealing a manganese compound having a higher oxidizing ability than cobalt oxyhydroxide in a polymeric compound (Japanese Unexamined Patent Publication No. hei 8-255628).

Although it has been propose to use a separator obtained by sulfonating an olefin type resin, this poses a problem that the sulfonation treatment reduces the strength of the separator to induce a physical short circuit between the positive and negative electrodes more easily, thereby possibly shortening the charge/discharge cycle life.

Also, when adding a manganese compound in the positive electrode, the surfaces of the positive electrode active material and the current collector are coated with the manganese compound, resulting in the problem that the charge efficiency and the large current charge/discharge characteristic of the battery are decreased. Furthermore, when using a microcapsule obtained by sealing a manganese compound having a higher oxidizing ability than cobalt oxyhydroxide in a polymeric compound, a high temperature is required in order to destroy the microcapsule, so that the negative electrode alloy becomes susceptible to oxidation thereby to deteriorate the performance of the negative electrode. In addition, after destroying the microcapsule, a manganese ion having a high oxidizing ability, which has been diffused in the negative electrode, oxidizes the alloy, thereby deteriorating the charge/discharge performance of the negative electrode.

The present invention is to solve such a problem and is aimed at providing a nickel-metal hydride storage battery exhibiting an excellent self-discharge resistance, while preventing the formation of a minute chemical short circuit between the positive and negative electrodes of the battery.

DISCLOSURE OF INVENTION

A nickel positive electrode plate in accordance with the present invention includes a porous nickel substrate and an active material comprising a hydroxide of nickel filled into the substrate, the positive electrode plate having a layer of a manganese compound containing manganese with a valence of 2 or more on the surface thereof.

It is effective that the active material is a solid solution of a hydroxide of nickel containing at least one selected from the group consisting of cobalt, zinc, magnesium and manganese.

It is also effective that the active material has a hydroxide of cobalt on the surface thereof.

It is also effective that the layer of a manganese compound has a thickness of 0.1 to 20 μm.

Further, an alkaline storage battery in accordance with the present invention comprises: the above nickel positive electrode plate; a negative electrode plate; a separator; and an alkaline electrolyte.

Then, a method of producing a nickel positive electrode plate in accordance with the present invention comprises the steps of: (1) filling an active material comprising a hydroxide of nickel into a porous nickel substrate; and (2) forming a layer of a manganese compound on the surface of the substrate filled with an active material.

In this production method, it is effective that the step (2) is a step of forming a layer of a manganese compound on the surface of the substrate by charging and discharging the substrate filled with an active material at least once, and immersing the substrate in a saturated alkaline solution containing manganese ions.

Alternatively, it is effective that the step (2) is a step of forming a layer of a manganese compound on the surface of the substrate by immersing the substrate filled with an active material in a saturated alkaline solution containing manganese ions, while applying a potential to the substrate.

Alternatively, it is effective that the step (2) is a step of forming a layer of a manganese compound on the surface of the substrate by applying a manganese compound containing manganese with a valence of 2 or more onto the surface of the substrate filled with an active material, and immersing the substrate in a saturated alkaline solution containing manganese ions, while applying a potential to the substrate.

Further, a method of producing an alkaline storage battery in accordance with the present invention comprises the steps of: (1) causing any one of a positive electrode plate, a negative electrode plate and a separator to retain a powder of metallic manganese or a manganese compound containing manganese with a valence of 2 or more; (2) assembling a battery by using the positive electrode plate, the negative electrode plate, the separator and an alkaline electrolyte; and (3) charging and discharging a resultant battery at least once.

In this case, it is effective that the step (1) is a step of applying a manganese compound containing manganese with a valence of 2 or more onto the surface of the positive electrode plate.

Alternatively, it is effective that the step (1) is a step of applying a manganese compound containing manganese with a valence of 2 or more onto the surface of the separator.

Alternatively, it is effective that the step (1) is a step of applying a manganese compound containing manganese with a valence of 2 or more onto the surface of the negative electrode plate.

It is effective that said step (1) is a step of adding a powder of metallic manganese or a manganese compound containing manganese with a valence of 2 or more in the negative electrode plate.

Alternatively, it is effective that the step (1) comprises a step of forming manganese hydroxide in a pore of the separator by immersing the separator in an aqueous solution of a manganese salt, followed by immersing in an aqueous alkaline solution, and another step of drying a resultant separator containing manganese hydroxide in an inert atmosphere or under a reduced pressure.

BEST MODE FOR CARRYING OUT THE INVENTION

Figure 1:
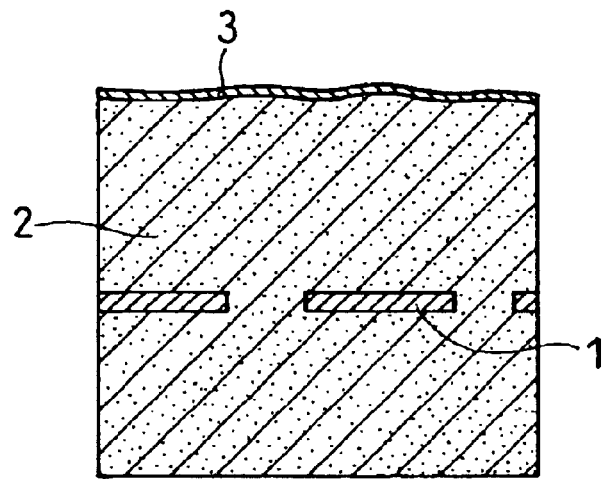
FIG. 1 is a schematic vertical sectional view of a relevant part of a nickel positive electrode plate in accordance with the present invention.

1. Nickel Positive Electrode Plate and Alkaline Storage Battery

In order to achieve a foregoing object, the present invention provides a positive electrode plate obtained by filling an active material mainly composed of a hydroxide of nickel into a porous nickel substrate (particularly, a sintered substrate), and the positive electrode plate has a layer of a manganese compound containing manganese with a valence of 2 or more formed on the surface of the plate.

By configuring an alkaline storage battery using this positive electrode plate, a negative electrode plate, a separator and an alkaline electrolyte, it is possible to provide a nickel-metal hydride storage battery exhibiting an excellent self-discharge resistance, high charge efficiency and superior large current charge/discharge characteristic.

Further, in the positive electrode plate in accordance with the present invention obtained by filling an active material mainly composed of a hydroxide of nickel into a porous sintered nickel substrate, a solid solution obtained by incorporating at least one selected from the group consisting of cobalt, zinc, magnesium and manganese into the hydroxide of nickel may be used as the active material, and a layer of a manganese compound containing manganese with a valence of 2 or more may be formed on the surface of the positive electrode plate.

By configuring an alkaline storage battery using this positive electrode plate, a negative electrode plate, a separator and an alkaline electrolyte, it is possible to provide a nickel-metal hydride storage battery exhibiting an excellent self-discharge resistance, high working voltage during discharging, high utilization of the active material at a high temperature and a long life.

In particular, the incorporation of cobalt into the active material nickel hydroxide can suppress a decrease in working voltage during discharging, so that the utilization of the positive electrode active material becomes high even at a high temperature. Further, the incorporation of zinc or magnesium, in particular, can prevent the positive electrode plate from swelling when the battery is overcharged to keep the amount of the electrolyte in the separator from fluctuating, thereby prolonging the charge/discharge cycle life. Furthermore, the incorporation of manganese increases the capacity of the positive electrode active material, thus making it possible to provide a battery with a high capacity.

Further, in the present invention, it is preferable that the active material has a hydroxide of cobalt on the surface thereof. In other words, in the positive electrode plate obtained by filling an active material mainly composed of a hydroxide of nickel into a porous sintered nickel substrate, the active material may comprise a solid solution obtained by incorporating at least one selected from the group consisting of cobalt, zinc, magnesium and manganese in a hydroxide of nickel, the active material may have a layer of a hydroxide of cobalt formed on the outer surface thereof, and a layer of a manganese compound containing manganese with a valence of 2 or more may be formed on the surface of the positive electrode plate.

By configuring an alkaline storage battery using this positive electrode plate, a negative electrode plate, a separator and an alkaline electrolyte, it is possible to provide a nickel-metal hydride storage battery capable of preventing the formation of a minute chemical short circuit between the positive and negative electrodes even when the battery voltage drops or a large current charge/discharge is conducted, while exhibiting an excellent self-discharge resistance, high working voltage during discharging and high utilization of the active material at a high temperature. This is presumably due to the fact that the dissolution of cobalt from the positive electrode in the battery can be suppressed under the above-described conditions.

As described above, in order to suppress a decrease in working voltage of the battery during discharging and to increase the utilization of the positive electrode active material even at a high temperature of 40° C. or above, cobalt hydroxide, which is a highly conductive substance, has been added in a nickel positive electrode plate, or a coating layer of a highly conductive hydroxide of cobalt has been formed on the surface of the active material. In an alkaline storage battery using such a positive electrode plate, cobalt in the vicinity of the surface of the positive electrode plate is prone to be dissolved when the battery voltage is decreased.

By contrast, in the present invention, a layer of a manganese compound containing manganese with a valence of 2 or more is formed on the surface of the nickel positive electrode plate, so that a cobalt ion trying to migrate to the separator is oxidized and captured by the layer of high-valent manganese. As a result, no cobalt ion is present in the separator, providing an effect of preventing the formation of a minute chemical short circuit between the positive and negative electrodes even when the battery is recharged.

Moreover, it is preferable that the layer of a manganese compound formed on the surface of the positive electrode plate has a thickness of 0.1 to 20 $\mu$m. When the thickness of the layer of a manganese compound is decreased to less than 0.1 $\mu$m, the effect of reducing the oxidation rate of hydrogen in the positive electrode active material becomes small and the dissolution of a cobalt ion from the positive electrode cannot be sufficiently suppressed, so that the effect of improving the self-discharge resistance tends to decrease. Alternatively, when the thickness of the layer of a manganese compound is increased to more than 20 $\mu$m, the oxidation rate of hydrogen in the positive electrode active material and the dissolution of a cobalt ion can be sufficiently suppressed; however, the charge efficiency of the active material tends to decrease. Therefore, the thickness of the layer of a manganese compound on the surface of the positive electrode plate in accordance with the present invention is preferably 0.1 to 20 $\mu$m. More preferably, it is 1 to 5 $\mu$m.

2. Method of Producing Nickel Positive Electrode Plate

A nickel positive electrode plate in accordance with the present invention as described above can be produced by conducting the steps of: (1) filling an active material comprising a hydroxide of nickel into a porous sintered nickel substrate; and (2) forming a layer of a manganese compound on the surface of the substrate filled with an active material. More specifically, the nickel positive electrode plate can be produced by the following production methods.

First, the nickel positive electrode plate in accordance with the present invention can be produced by filling an active material mainly composed of a hydroxide of nickel into a porous sintered nickel substrate, and then charging and discharging the substrate at least once, followed by immersing in a saturated alkaline solution containing manganese ions. In other words, the step (2) is a step of forming a layer of a manganese compound on the surface of the substrate by charging and discharging the substrate filled with an active material at least once, and immersing the substrate in a saturated alkaline solution containing manganese ions.

The substrate is charged and discharged before immersed in a saturated alkaline solution containing manganese ions to convert a hydroxide of nickel as the active material into an oxide having a valence of 2 or more, so that the manganese ion in the alkaline solution is brought into contact with the oxide of nickel having a valence of 2 or more present on the surface of the substrate and is thus oxidized to be converted into an insoluble high-valent oxide, thereby forming a desired layer of a manganese compound.

The nickel positive electrode plate in accordance with the present invention can also be obtained by filling an active material mainly composed of a hydroxide of nickel into a porous sintered nickel substrate, and subsequently immersing the substrate in a saturated alkaline solution containing manganese ions, while applying a potential to the substrate.

That is, in this case, the step (2) is a step of forming a layer of a manganese compound on the surface of the substrate by immersing the substrate filled with an active material in a saturated alkaline solution containing manganese ions, while applying a potential to the substrate.

According to this production method, while applying a potential, the manganese ion in the alkaline solution is directly oxidized on the surface of the substrate to be converted into an insoluble high-valent oxide, thereby forming a desired layer of a manganese compound.

Further, the nickel positive electrode plate in accordance with the present invention can also be produced by filling an active material mainly composed of a hydroxide of nickel into a porous sintered nickel substrate, subsequently applying a manganese compound containing manganese with a valence of 2 or more onto the surface of the substrate, and immersing the substrate in an alkaline solution, while applying a potential thereto.

That is, in this case, the step (2) is a step of forming a layer of a manganese compound on the surface of the substrate by applying a manganese compound containing manganese with a valence of 2 or more onto the surface of the substrate filled with an active material, and immersing the substrate in a saturated alkaline solution containing manganese ions, while applying a potential to the substrate.

According to this production method, the substrate applied with the manganese compound containing the manganese with a valence of 2 or more is immersed in an alkaline solution, while applying a potential to the substrate, so that the manganese in the alkaline solution is oxidized on the surface of the substrate to be converted into an insoluble high-valent oxide, thereby forming a desired layer of a manganese compound.

3. Method of Producing Alkaline Storage Battery

The present invention also relates to an alkaline storage battery using the above-described nickel positive electrode plate.

This alkaline storage battery can be produced by conducting the steps of: (1) causing any one of a positive electrode plate, a negative electrode plate and a separator to retain a powder of metallic manganese or a manganese compound containing manganese with a valence of 2 or more; (2) assembling a battery by using the positive electrode plate, the negative electrode plate, the separator and an alkaline electrolyte; and (3) charging and discharging a resultant battery at least once. More specifically, the battery can be produced in the following manner.

First, the alkaline storage battery using the nickel positive electrode plate in accordance with the present invention can be produced by filling an active material mainly composed of a hydroxide of nickel into a porous sintered nickel substrate, subsequently configuring an alkaline storage battery by using the substrate applied with a manganese compound containing manganese with a valence of 2 or more on the surface thereof (a so-called precursor of the positive electrode plate), a negative electrode plate, a separator and an alkaline electrolyte, and charging and discharging the above battery at least once. That is, in this case, the step (1) is a step of applying a manganese compound containing manganese with a valence of 2 or more onto the surface of the substrate constituting the positive electrode plate.

According to this production method, the configured battery is charged and discharged at least once to convert the hydroxide of nickel as the positive electrode active material into an oxide containing nickel with a valence of 2 or more, and this oxide is allowed to stand for a certain period to ionize the manganese compound containing manganese with a valence of 2 or more applied on the surface of the positive electrode plate. At that place, the manganese ion is then oxidized by an oxide of nickel containing nickel with a valence of 2 or more to be converted into an insoluble high-valent oxide on the surface of the positive electrode plate, thereby forming a desired layer of a manganese compound. In this case, it is preferable that the battery is allowed to stand at an ambient temperature of 40° C. to 70° C. in order to accelerate the ionization rate of the manganese compound containing manganese with a valence of 2 or more.

Further, an alkaline storage battery comprising: the positive electrode plate in accordance with the present invention obtained by filling an active material mainly composed of a hydroxide of nickel into a porous sintered nickel substrate; a negative electrode plate; a separator; and an alkaline electrolyte can be produced by configuring a battery using a separator applied with a manganese compound containing manganese with a valence of 2 or more on the surface thereof, and charging and discharging the battery at least once. That is, in this case, the step (1) is a step of applying a manganese compound containing manganese with a valence of 2 or more onto the surface of the separator.

According to this production method, the configured battery is charged and discharged at least once to convert the hydroxide of nickel as the positive electrode active material into an oxide containing nickel with a valence of 2 or more. Then, this is allowed to stand, so that the manganese compound containing manganese with a valence of 2 or more applied on the surface of the separator is dissolved into the electrolyte to migrate to the surface of the positive electrode plate. Further, the manganese ion is oxidized by nickel oxide containing nickel with a valence of 2 or more on the surface of the positive electrode plate to be converted into an insoluble high-valent oxide, thereby forming a desired layer of a manganese compound. Here, it is preferable that the battery is allowed to stand at an ambient temperature of 40° C. to 70° C. in order to accelerate the ionization rate of the manganese compound containing manganese with a valence of 2 or more.

Further, an alkaline storage battery comprising: the positive electrode plate in accordance with the present invention obtained by filling an active material mainly composed of a hydroxide of nickel into a porous sintered nickel substrate; a negative electrode plate; a separator; and an alkaline electrolyte can be produced by configuring a battery using a negative electrode plate applied with a manganese compound containing manganese with a valence of 2 or more onto the surface thereof, and charging and discharging the battery at least once. That is, in this case, the step (1) is a step of applying a manganese compound containing manganese with a valence of 2 or more onto the surface of the negative electrode plate.

According to this production method, the configured battery is charged and discharged at least once to convert the hydroxide of nickel as the positive electrode active material into an oxide of nickel with a valance of 2 or more. Then, this is further allowed to stand, so that the manganese compound containing manganese with a valence of 2 or more applied onto the surface of the negative electrode plate is dissolved into the electrolyte inside the battery to migrate to the positive electrode side via the separator. The manganese ion which has reached the surface of the positive electrode plate is oxidized by nickel oxide containing nickel with a valence of 2 or more to be converted into an insoluble high-valent oxide, thereby forming a desired layer of a manganese compound on the surface of the positive electrode plate. In this case, it is also preferable that the battery is allowed to stand at an ambient temperature of 40° C. to 70° C. in order to accelerate the ionization rate of the manganese compound containing manganese with a valence of 2 or more.

Further, an alkaline storage battery comprising: a positive electrode plate in accordance with the present invention obtained by filling an active material mainly composed of a hydroxide of nickel into a porous sintered nickel substrate; a negative electrode plate; a separator; and an alkaline electrolyte can be produced by configuring a battery using a negative electrode plate added or filled with a powder of metallic manganese or a manganese compound containing manganese with a valence of 2 or more, and charging and discharging the battery at least once. That is, in this case, the step (1) is a step of adding a powder of metallic manganese or a manganese compound containing manganese with a valence of 2 or more in the negative electrode plate.

According to this production method, the battery is charged and discharged at least once and subsequently allowed to stand, so that the manganese compound containing manganese with a valence of 2 or more or the powder of metallic manganese added in the negative electrode plate is dissolved into the electrolyte to migrate to the positive electrode side via the separator. Then, the manganese ion which has reached the surface of the positive electrode plate is oxidized by nickel oxide containing nickel with a valence of 2 or more to be converted into an insoluble high-valent oxide, thereby forming a desired layer of a manganese compound on the surface of the positive electrode plate. Here, it is also preferable that the battery is allowed to stand at an ambient temperature of 40° C. to 70° C. in order to accelerate the ionization rate of the manganese compound containing manganese with a valence of 2 or more.

Further, an alkaline storage battery comprising: the positive electrode plate in accordance with the present invention obtained by filling an active material mainly composed of a hydroxide of nickel into a porous sintered nickel substrate; a negative electrode plate; a separator; and an alkaline electrolyte can be produced by conducting the steps of: immersing the separator in an aqueous solution of a manganese salt; forming manganese hydroxide in the separator by neutralizing the separator with an aqueous alkaline solution; drying the separator in an inert atmosphere or under a reduced pressure (in a vacuum); and charging and discharging the battery at least once. That is, in this case, the step (1) comprises a step of forming manganese hydroxide in a pore of the separator by immersing the separator in an aqueous solution of a manganese salt, followed by immersing in an aqueous alkaline solution, and another step of drying a resultant separator containing manganese hydroxide in an inert atmosphere or under a reduced pressure.

According to this production method, the configured battery is charged and discharged at least once to convert the hydroxide of nickel as the positive electrode active material into an oxide containing nickel with a valence of 2 or more. Then, this is further allowed to stand, so that the manganese compound containing manganese with a valence of 2 or more contained inside the separator is dissolved into the electrolyte to migrate to the surface of the positive electrode plate. Then, the manganese ion is oxidized by nickel oxide containing nickel with a valence of 2 or more on the surface of the positive electrode plate to be converted into an insoluble high-valent oxide, thereby forming a desired layer of a manganese compound. Here, it is also preferable that the battery is allowed to stand at an ambient temperature of 40° C. to 70° C. in order to accelerate the ionization rate of the manganese compound containing manganese with a valence of 2 or more.

Hereinbelow, the present invention will be more specifically described by using examples; however, the present invention is not limited thereto.

EXAMPLE 1

A sintered nickel substrate with a porosity of approximately 89% prepared by sintering a nickel powder on a punched metal made of nickel in a reducing atmosphere was immersed in an aqueous solution of nickel nitrate with a concentration of 9.5 mol/l and cobalt nitrate with a concentration of 0.06 mol/l having a pH of 1.9 at a temperature of 80° C., dried sufficiently at a temperature of 80° C., and then immersed in an aqueous solution of sodium hydroxide with a concentration of 25% at a temperature of 80° C. to convert a nickel salt into nickel hydroxide and a cobalt salt into cobalt hydroxide. Subsequently, a series of active material filling operations, consisting of removal of the alkaline solution by a sufficient washing with water and drying, was performed on the substrate seven times, thereby filling an active material obtained by partly incorporating cobalt into an Ni portion of nickel hydroxide into the sintered nickel substrate.

Furthermore, this substrate was subjected to two charge/discharge cycles, each consisting of charging at 80° C. at a current value of 1 CmA to 135% of the positive electrode capacity and discharging at a current value of 1 CmA to 30% of the positive electrode capacity. Thereafter, this substrate was immersed in an aqueous solution of potassium hydroxide with manganese sulfate saturated therein having a specific gravity of 1.30 at 80° C. for 20 minutes, and then washed sufficiently with water to remove a sulfate ion therefrom, thereby producing a nickel positive electrode plate "a" in accordance with the present invention. A schematic vertical sectional view of the structure of the positive electrode plate "a" thus obtained is shown in FIG. 1. In FIG. 1, retained on the both sides of a punched metal 1 is a layer 2 which comprises a sintered nickel constituting the substrate and a solid solution of a hydroxide of nickel and a hydroxide of cobalt as the active material filled thereinto, and a layer 3 of a manganese compound containing manganese with a valence of 2 or more is further formed.

A negative electrode plate was fabricated in the following manner. To 100 parts by weight of a hydrogen storage alloy represented by the formula: $MmNi_{3.55}Co_{0.75}Mn_{0.4}Al_{0.3}$ (where Mm is Misch metal, a mixture of rare earth elements), 0.15 part by weight of carboxymethyl cellulose as the thickener, 0.3 part by weight of carbon black as the conductive agent, 0.8 part by weight of a styrene-butadiene copolymer as the binder and water as the dispersion medium were added to prepare a paste. This paste was applied to a core material made of a punched metal, and the whole was dried, pressed and further coated with powders of fluorocarbon resin on the surface thereof, followed by cutting into a predetermined size, thereby fabricating a negative electrode plate "a" comprising a hydrogen storage alloy with a capacity of 2200 mAh.

This negative electrode plate "a", a positive electrode plate "a" with a capacity of 1500 mAh and a separator made of a nonwoven fabric of polypropylene were combined and rolled up together in a spiral fashion to configure an electrode assembly, and the obtained electrode assembly was inserted into a metal case. Thereafter, a predetermined, amount of an electrolyte with 40 g/l of lithium hydroxide dissolved therein was injected into an aqueous solution of potassium hydroxide with a specific gravity of 1.30, and the case was sealed with a sealing plate at the top thereof, thereby configuring an alkaline storage battery A with a nominal capacity of 1500 mAh in accordance with the present invention.

Comparative Example 1

Figure 2:
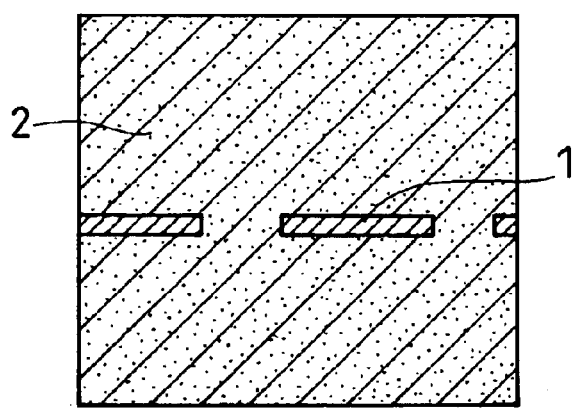
FIG. 2 is a schematic vertical sectional view of a relevant part of a nickel positive electrode plate of a comparative example.

A nickel positive electrode plate "b" was fabricated in the same manner as in Example 1, except that the layer of a manganese compound was not formed. A schematic vertical sectional view of this nickel positive electrode plate "b" is shown in FIG. 2. In FIG. 2, retained on the both sides of the punched metal 1 is a layer 2 which comprises a sintered nickel constituting the substrate and a solid solution of a hydroxide of nickel and a hydroxide of cobalt as the active material filled thereinto.

Subsequently, an alkaline storage battery B having the same structure as the alkaline storage battery A was fabricated using the nickel positive electrode plate "b" in the same manner as in Example 1.

Comparative Example 2

Figure 3:
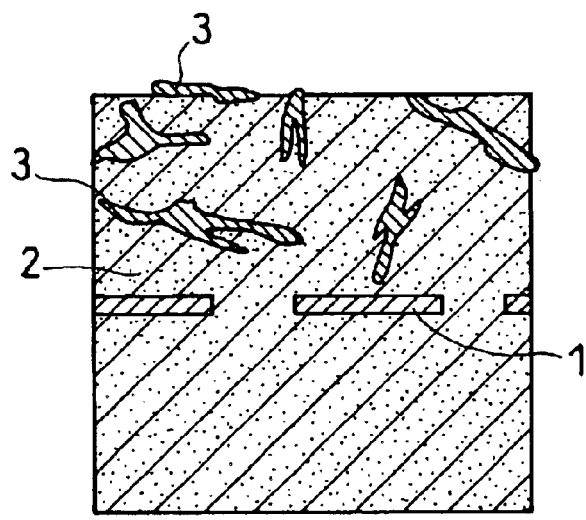
FIG. 3 is a schematic vertical sectional view of a relevant part of a nickel positive electrode plate of a comparative example.

After filling a solid solution of nickel hydroxide and cobalt hydroxide as the active material into a sintered nickel substrate under the same conditions as those used for the fabrication of the nickel positive electrode plate "a" in Example 1, this substrate was immersed in an aqueous solution of manganese sulfate with a concentration of 0.1 mol/l at a temperature of 80° C. Subsequently, this substrate was dried sufficiently at an ambient temperature of 80° C., and then immersed in an aqueous solution of sodium hydroxide with a concentration of 25% at a temperature of 80° C. to convert a manganese salt into manganese hydroxide. Further, the substrate was washed sufficiently with water to remove a sulfate ion therefrom, and the surface of the cobalt hydroxide was coated with the manganese hydroxide. Then, the substrate was subjected to two charge/discharge cycles under the same conditions as those used for the nickel positive electrode plate "a", thereby fabricating a nickel positive electrode plate "c" as a comparative example. A schematic vertical sectional view of the nickel substrate "c" is shown in FIG. 3. In FIG. 3, retained on the both sides of a punched metal 1 is a layer 2 which comprises a sintered nickel constituting the substrate and a solid solution of a hydroxide of nickel and a hydroxide of cobalt as the active material filled thereinto. Further, a manganese compound 3 containing manganese with a valence of 2 or more is diffused in the layer 2.

Subsequently, an alkaline storage battery C as a comparative example was fabricated by using the nickel positive electrode plate "c" in the same manner as that used for the alkaline storage battery A of Example 1.

[Evaluation]

First, the cross sections of the nickel positive electrode plates "a" to "c" fabricated as above were examined by means of an EPMA. In the case of the nickel positive electrode plate "a", it was observed that a layer of a manganese compound with an average thickness of 8 $\mu$m was formed on the surface of the positive electrode plate. In the case of the positive electrode plate "b", no manganese compound was observed on the surface of the positive electrode plate. Also, in the case of the positive electrode plate "c", it was observed that a layer of a manganese compound was formed inside the positive electrode plate and that almost no layer of a manganese compound was formed on the surface of the positive electrode plate.

Next, the alkaline storage batteries A to C fabricated as above were subjected to two charge/discharge cycles, each consisting of charging at 20° C. at 150 mA for 15 hours and discharging at 300 mA until the terminal voltage of each battery reached 1.0 V, thereby carrying out an initial activation of the battery. Thereafter, the utilization of the positive electrode active material at a high temperature, the large current discharge characteristic and the self-discharge resistance were evaluated for each battery.

The utilization of the positive electrode active material at a high temperature was evaluated as follows: each battery was charged at a current of 150 mA at 50° C. for 15 hours and discharged at a current of 300 mA at 20° C. until the terminal voltage of the battery reached 1.0 V to measure the discharge capacity, and the ratio of the measured discharge capacity to the initial discharge capacity were determined. The result was shown in Table 1 as the charge efficiency.

The large current discharge characteristic was evaluated as follows: each battery was subjected to 10 charge/discharge cycles, each consisting of charging at a current of 1500 mA at 20° C. for 1.2 hours and discharging at 1500 mA until the terminal voltage of the battery reached 1.0 V, followed by charging at 1500 mA at 20° C. for 1.2 hours and discharging at 7500 mA until the terminal voltage of the battery reached 0.8 V, and the average discharge voltage and the ratio of the discharge capacity to the initial capacity were determined. The result was shown in Table 1.

Further, the self-discharge resistance was evaluated as follows: each battery was subjected to 100 charged/discharge cycles, each consisting of charging at 3000 mA at 20° C. for 0.6 hour and discharging at 3000 mA until the terminal voltage of the battery reached 0.8 V, followed by charging at 150 mA at 20° C. for 15 hours and discharging at 300 mA until the terminal voltage of the battery reached 1.0 V, and the discharge capacity before standing was determined for each battery. Subsequently, after charged at 20° C. at 150 mA for 15 hours, each of these alkaline storage batteries A to C was allowed to stand at an ambient temperature of 45° C. for 30 days, followed by discharging at 20° C. at 300 mA until the terminal voltage reached 1.0 V, and the discharge capacity of each alkaline storage battery after standing was determined. The result was shown in Table 1 as the capacity retention ratio.

TABLE 1

| Battery | Charge efficiency of positive electrode active material at 50° C. (%) | Discharge capacity ratio during large current discharge (%) | Average discharge voltage during large current discharge (V) | Capacity retention ratio after standing at 45° C. for 30 days (%) |
|---|---|---|---|---|
| A | 80 | 82 | 1.01 | 80 |
| B | 80 | 81 | 1.00 | 72 |
| C | 72 | 74 | 0.91 | 78 |

As is clear from Table 1, the alkaline storage battery A in accordance with the present invention was by no means inferior to the alkaline storage battery B of Comparative Example 1 in the charge efficiency of the positive electrode active material and the large current discharge characteristic, while exhibiting a greater capacity retention ratio after standing at a high temperature.

The reason was presumably that in the case of the alkaline storage battery A of Example 1, a layer of a manganese compound containing manganese with a valence of 2 or more was formed on the surface of the nickel positive electrode plate, thereby suppressing the decomposing rate of the positive electrode active material due to hydrogen. Further, since the layer of a manganese compound was formed only on the surface of the positive electrode plate, the electronic conductivity among the positive electrode active materials was not impaired, so that the charge efficiency of the positive electrode active material and the large current discharge characteristic were not deteriorated.

On the other hand, in the case of the alkaline storage battery C of Comparative Example 2, since manganese was added in the nickel positive electrode plate, the manganese compound coated the surfaces of the positive electrode active material and the current collector, instead of the surface of the positive electrode plate. Consequently, while the self-discharge resistance was improved, the electronic conductivity among the positive electrode active materials was impaired, so that the charge efficiency and the large current charge/discharge characteristic were deteriorated.

In the case of the nickel positive electrode plate used in the alkaline storage battery of Example 1, a layer of a manganese compound with an average thickness of 8 $\mu$m was formed on the surface thereof; however, it should be noted that with any thickness in the range of 1 to 20 $\mu$m, it was possible to obtain an alkaline storage battery whose charge efficiency of the positive electrode active material and large current discharge characteristic were almost as excellent as those of the example and which had a greater capacity retention ratio after standing at a high temperature.

The nickel positive electrode plate used in the alkaline storage battery of Example 1 was formed by filling an active material mainly composed of a hydroxide of nickel into a porous sintered nickel substrate, and the positive electrode plate was charged and discharged twice, followed by immersing in a saturated alkaline solution of manganese ions, thereby fabricating the alkaline storage battery. However, the same function and effect could be achieved by using a positive electrode plate, which is obtained by immersing a positive electrode plate in a saturated alkaline solution of manganese ions while applying a potential thereto to apply a manganese compound containing manganese with a valence of 2 or more onto the surface of the positive electrode plate, and immersing the positive electrode plate in an alkaline solution while applying a potential thereto.

In the case of the nickel positive electrode plate used in the alkaline storage battery of Example 1, the active material filled into the porous sintered nickel substrate was obtained by incorporating cobalt into a hydroxide of nickel; however, the same function and effect could be achieved by using an active material obtained by incorporating one element selected from the group consisting of zinc, magnesium and manganese into a hydroxide of nickel, or another active material obtained by incorporating a plurality of elements selected from the group consisting of cobalt, zinc, magnesium and manganese into a hydroxide of nickel.

EXAMPLE 2

A sintered nickel substrate with a porosity of approximately 89% prepared through sintering in a reducing atmosphere was immersed in an aqueous solution of nickel nitrate with a concentration of 9.5 mol/l and cobalt nitrate with a concentration of 0.06 mol/l having a pH of 1.9 at a temperature of 80° C., dried sufficiently at a temperature of 80° C., and then immersed in an aqueous solution of sodium hydroxide with a concentration of 25% at a temperature of 80° C. to convert a nickel salt into nickel hydroxide and a cobalt salt into cobalt hydroxide. Subsequently, a series of active material filling operations, consisting of removal of the alkaline solution by a sufficient washing with water and drying, was performed on the substrate seven times, thereby filling a solid solution of cobalt hydroxide and nickel hydroxide into the sintered nickel substrate. Further, this positive electrode plate was immersed in an aqueous solution of cobalt nitrate with a concentration of 4.0 mol/l having a pH of 2.5 at 30° C., dried sufficiently at an ambient temperature of 80° C., and then immersed in an aqueous solution of sodium hydroxide with a concentration of 25% at a temperature of 80° C. to convert a cobalt salt into cobalt hydroxide.

Subsequently, the substrate was washed sufficiently with water to remove the alkaline solution therefrom, and was subsequently subjected to two charge/discharge cycles, each consisting of charging at a current value of 1 CmA at 80° C. to 135% of the positive electrode capacity and discharging at a current value of 1 CmA to 30% of the positive electrode capacity and, thereafter, this substrate was immersed in an aqueous solution of potassium hydroxide with manganese sulfate saturated therein having a specific gravity of 1.30 at 80° C. for 20 minutes, and further washed sufficiently with water to remove a sulfate ion therefrom, thereby producing a nickel positive electrode plate "d" in accordance with the present invention.

Figure 4:
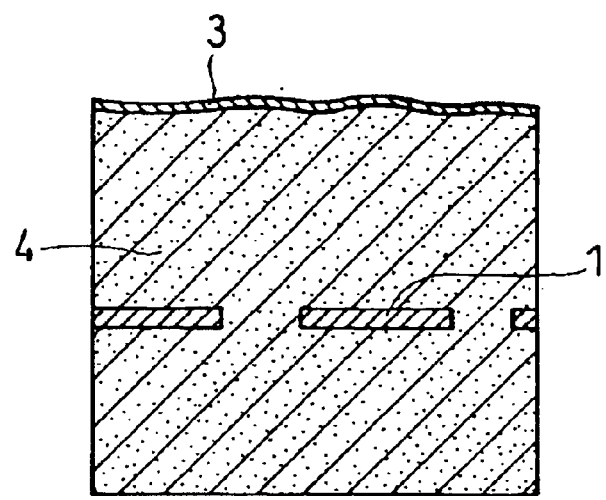
FIG. 4 is a schematic vertical sectional view of a relevant part of a nickel positive electrode plate in accordance with the present invention.

A schematic vertical sectional view of the nickel positive electrode plate Add thus obtained is shown in FIG. 4. In FIG. 4, retained on the both sides of a punched metal 1 is a layer 4 which comprises a sintered nickel constituting the substrate, a solid solution of a hydroxide of nickel and a hydroxide of cobalt as the active material filled thereinto, and cobalt hydroxide coating the active material; further, a layer 3 of a manganese compound containing manganese with a valence of 2 or more is formed.

An alkaline storage battery D in accordance with the present invention was fabricated by using this nickel positive electrode plate "d" in the same manner as that used for the alkaline storage battery A of Example 1.

Comparative Example 3

Figure 5:
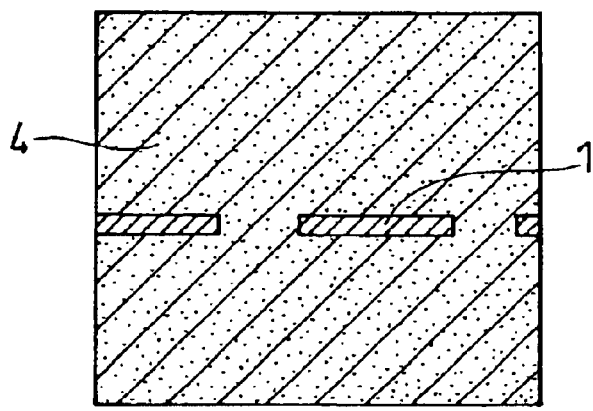
FIG. 5 is a schematic vertical sectional view of a relevant part of a nickel positive electrode plate of a comparative example.

A nickel positive electrode plate "e" was fabricated in the same manner as in Example 2, except that the layer of a manganese compound was not formed. A schematic vertical sectional view of this nickel positive electrode plate "e" is shown in FIG. 5. In FIG. 5, retained on the both sides of a punched metal 1 is a layer 4 which comprises a sintered nickel constituting the substrate, a solid solution of a hydroxide of nickel and a hydroxide of cobalt as the active material filled thereinto, and cobalt hydroxide coating the active material.

Subsequently, an alkaline storage battery E as a comparative example having the same structure as the alkaline storage battery A of Example 1 was fabricated by using the nickel positive electrode plate "e".

Comparative Example 4

Figure 6:
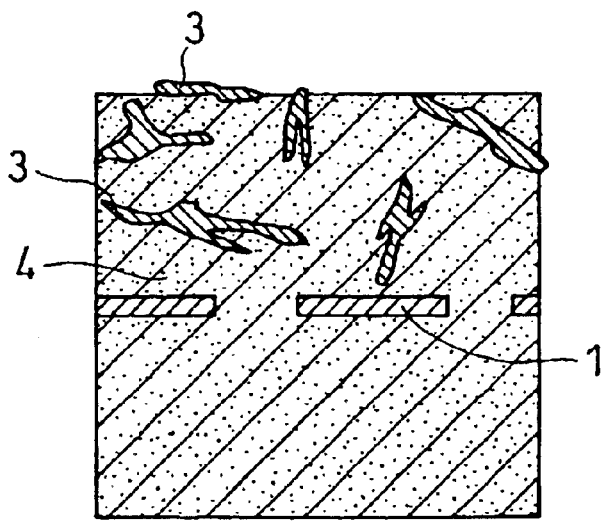
FIG. 6 is a schematic vertical sectional view of a relevant part of a nickel positive electrode plate of a comparative example.

After filling a solid solution of nickel hydroxide and cobalt hydroxide as the active material into a sintered nickel substrate under the same conditions as those used for the fabrication of the positive electrode plate "d" in Example 3, the surface of the active material was coated with the cobalt hydroxide, and the surface of the cobalt hydroxide was further coated with manganese hydroxide under the same conditions as those used for the above nickel positive electrode plate "c". Subsequently, the substrate was subjected to two charge/discharge cycles under the same conditions as those used for the nickel positive electrode plate "d", thereby fabricating a nickel positive electrode plate "f" as a comparative example. A schematic vertical sectional view of this nickel positive electrode "f" is shown in FIG. 6. In FIG. 6, retained on the both sides of a punched metal 1 is a layer 4 which comprises a sintered nickel constituting the substrate, a solid solution of a hydroxide of nickel and a hydroxide of cobalt as the active material filled thereinto, and cobalt hydroxide coating the active material.

Subsequently, an alkaline storage battery F as a comparative example was fabricated in the same manner as that used for the alkaline storage battery A of Example 1 by using the nickel positive electrode plate "f".

[Evaluation]

First, the cross sections of the nickel positive electrode plates "d" to "f" fabricated as above were examined by means of an EPMA. In the case of the nickel positive electrode plate "d", it was confirmed that the upper portion of the solid solution of nickel hydroxide and cobalt hydroxide was coated with cobalt hydroxide and that a layer of a manganese compound with an average thickness of 8 µm was formed on the surface of the positive electrode plate. In the case of the positive electrode plate "e", it was observed that the upper portion of the solid solution of nickel hydroxide and cobalt hydroxide was coated with cobalt hydroxide and that no layer of a manganese compound was present on the surface of the positive electrode plate. In the case of the positive electrode plate "f", it was observed that the upper portion of the solid solution of nickel hydroxide and cobalt hydroxide was coated with cobalt hydroxide, that a layer of a manganese compound was formed inside the positive electrode plate and that almost no layer of a manganese compound was formed on the surface of the positive electrode plate.

Next, the alkaline storage batteries D to F fabricated as above were tested in the same manner as in Example 1. The result was shown in Table 2.

TABLE 2

| Battery | Charge efficiency of positive electrode active material at 50° C. (%) | Discharge capacity ratio during large current discharge (%) | Average discharge voltage during large current discharge (V) | Capacity retention ratio after standing at 45° C. for 30 days (%) |
| --- | --- | --- | --- | --- |
| D | 92 | 91 | 1.05 | 80 |
| E | 92 | 92 | 1.03 | 62 |
| F | 80 | 84 | 0.95 | 71 |

As is clear from Table 2, the alkaline storage battery D of Example 2 was by no means inferior to the alkaline storage battery E of Comparative Example 3 in the charge efficiency of the positive electrode active material and the large current discharge characteristic, while exhibiting a greater capacity retention ratio after standing at a high temperature.

The reason was presumably that in the case of the alkaline storage battery D of Example 2, a layer of a manganese compound containing manganese with a valence of two or more was formed on the surface of the nickel positive electrode plate, causing a cobalt ion trying to migrate from the positive electrode to the separator to be oxidized and captured by the layer of a high-valent manganese compound. Consequently, no cobalt ion was present in the separator, so that no minute chemical short circuit was formed between the positive and negative electrodes when the battery was recharged. Additionally, since the layer of the manganese compound was formed only on the surface of the positive electrode plate, the electronic conductivity among the positive electrode active materials was not impaired, and thus, the charge efficiency of the positive electrode active material and the large current discharge characteristic were not deteriorated.

On the other hand, in the case of the alkaline storage battery E of the comparative example, no layer of a manganese compound was formed on the surface of the nickel positive electrode plate, so that the positive electrode of the battery was partially overcharged through a large current discharge to change β-CoOOH into cobalt hydroxide. Then, the reduced cobalt, particularly the cobalt on the surface of the positive electrode plate migrated to the separator, and thus a cobalt ion in the separator that was in contact with the surfaces of the positive and negative electrodes was oxidized to form a minute chemical short circuit between the positive and negative electrodes, thereby significantly deteriorating the self-discharge resistance.

In the case of the alkaline storage battery F of the comparative example, since manganese was added in the nickel positive electrode, the manganese compound coated the surfaces of the positive electrode active material and the current collector, instead of the surface of the positive electrode plate. Consequently, while the self-discharge resistance was improved, the electronic conductivity among the positive electrode active materials was impaired, so that the charge efficiency and the large current charge/discharge characteristic were deteriorated.

Here, a layer of a manganese compound with an average thickness of 8 μm was formed on the surface of the nickel positive electrode plate used for the alkaline storage battery of Example 2; however, with any thickness in the range of 1 to 20 μm, it was possible to obtain an alkaline storage battery whose charge efficiency of the positive electrode active material and the large current discharge characteristic were almost as excellent as those of the example and which had a greater capacity retention ratio after standing at a high temperature.

In the case of the nickel positive electrode plate used in the alkaline storage battery of Example 2, an active material mainly composed of a hydroxide of nickel was filled into a porous sintered nickel substrate, and then the substrate was charged and discharged twice, followed by immersing in a saturated alkaline solution of manganese ions, thereby fabricating an alkaline storage battery. However, the same function and effect could be achieved by using a positive electrode plate obtained by immersing the substrate in a saturated alkaline solution of manganese ions while applying a potential thereto, and another positive electrode plate obtained by applying a layer of a manganese compound containing manganese with a valence of 2 or more on the surface of the substrate, and then immersing the substrate in an alkaline solution while applying a potential thereto.

In the case of the nickel positive electrode plate used in the alkaline storage battery of Example 2, the active material filled into the porous sintered nickel substrate was obtained by incorporating cobalt into a hydroxide of nickel; however, the same function and effect could be achieved by using an active material obtained by incorporating one element selected from the group consisting of zinc, magnesium and manganese into a hydroxide of nickel, or another active material obtained by incorporating a plurality of elements selected from the group consisting of cobalt, zinc, magnesium and manganese into a hydroxide of nickel.

EXAMPLE 3

A sintered nickel substrate with a porosity of approximately 85% prepared through sintering in a reducing atmosphere was immersed in an aqueous solution of nickel nitrate with a concentration of 5.5 mol/l and cobalt nitrate with a concentration of 0.06 mol/l having a pH of 1.5 at a temperature of 80° C., dried sufficiently at a temperature of 80° C., and then immersed in an aqueous solution of sodium hydroxide with a concentration of 25% at a temperature of 80° C. to convert a nickel salt into nickel hydroxide and a cobalt salt into cobalt hydroxide. Subsequently, a series of active material filling operations, consisting of removal of the alkaline solution by a sufficient washing with water and drying, was performed on the substrate seven times, thereby filling a solid solution of nickel hydroxide and cobalt hydroxide into the sintered nickel substrate.

Further, this substrate was immersed in an aqueous solution of cobalt nitrate with a concentration of 4.0 mol/l having a pH of 2.5 at 30° C., dried sufficiently at an ambient temperature of 80° C., and then immersed in an aqueous solution of sodium hydroxide with a concentration of 25% at a temperature of 80° C. to convert a cobalt salt into cobalt hydroxide. Subsequently, the substrate was washed sufficiently with water to remove the alkaline solution therefrom, and then a coating of manganese hydroxide with a thickness of 10 μm was applied onto the surface of the substrate, followed by drying at 80° C., thereby fabricating a nickel positive electrode plate "g" in accordance with the present invention.

Then, an alkaline storage battery G was fabricated by using the nickel positive electrode plate "g" in the same manner as that used for the alkaline storage battery A of Example 1.

EXAMPLE 4

A nickel positive electrode plate "h" of Example 4 in accordance with the present invention was fabricated in the same manner as that used for the nickel positive electrode plate "g" of Example 3, except that the layer of manganese hydroxide was not formed.

Then, a coating of manganese hydroxide with a thickness of 10 μm was applied onto one surface (the surface opposite the positive electrode) of the separator made of a nonwoven fabric of polypropylene, thereby fabricating a separator "h" of Example 4.

An alkaline storage battery H of Example 4 in accordance with the present invention was fabricated in the same manner as that used for the alkaline storage battery A of Example 1, except for the use of the above separator "h" and nickel positive electrode plate "h".

EXAMPLE 5

A nickel positive electrode plate "i" of Example 5 in accordance with the present invention was fabricated in the same manner as that used for the nickel positive electrode plate "g" of Example 3, except that the layer of manganese hydroxide was not formed.

Subsequently, a coating of manganese hydroxide with a thickness of 10 μm was applied onto the surface of a negative electrode plate comprising a hydrogen storage alloy, followed by drying, thereby fabricating a negative electrode plate "i" of Example 5.

An alkaline storage battery I of Example 5 in accordance with the present invention was fabricated in the same manner as that used for the alkaline storage battery A of Example 1, except for the use of the above negative electrode plate "i" and nickel positive electrode plate "i".

EXAMPLE 6

A nickel positive electrode plate "j" of Example 6 in accordance with the present invention (having the same structure as the positive electrode plate "e" of Comparative Example 3) was fabricated in the same manner as that used for the nickel positive electrode plate "g" of Example 3, except that the layer of manganese hydroxide was not formed.

Then, a negative electrode plate "j" having the same structure as the negative electrode plate "a" was fabricated in the same manner as in the production method of the negative electrode comprising a hydrogen storage alloy of the alkaline storage battery A of Example 1, except that 5.0 parts by weight of manganese hydroxide per 100 parts by weight of the hydrogen storage alloy was added in the paste.

An alkaline storage battery J of Example 6 in accordance with the present invention was fabricated in the same manner as that used for the alkaline storage battery A of Example 1, except for the use of the above negative electrode plate "j" and nickel positive electrode plate "j".

EXAMPLE 7

A nickel positive electrode plate "k" of Example 7 in accordance with the present invention (having the same structure as the positive electrode plate "e" of Comparative Example 3) was fabricated in the same manner as that used for the nickel positive electrode plate "g" of Example 3, except that the layer of manganese hydroxide was not formed.

Then, a separator made of a nonwoven fabric of polypropylene was immersed in an aqueous solution of manganese sulfate with a concentration of 4.0 mol/l at 30° C., and then immersed in an aqueous solution of sodium hydroxide with a concentration of 25% at a temperature of 30° C. to convert a manganese salt into manganese hydroxide. Subsequently, the separator was washed sufficiently with water to remove the alkaline solution and vacuum dried, followed by cutting into a predetermined size, thereby producing a separator "k" in accordance with the present invention having a layer of manganese hydroxide with a thickness of 10 μm.

An alkaline storage battery K of Example 7 in accordance with the present invention was fabricated in the same manner as that used for the alkaline storage battery A of Example 1, except for the use of the above separator "k" and nickel positive electrode plate "k".

[Evaluation]

The alkaline storage batteries G to K fabricated as above were subjected to two charge/discharge cycles, each consisting of charging at 20° C. at a current of 150 mA for 15 hours and discharging at a current of 1500 mA to 30% of the positive electrode capacity and, thereafter, each battery was allowed to stand at 60° C. for three days. These batteries were tested in the same manner as in Example 1. The result was shown in Table 3. For comparison, the result obtained for the alkaline storage battery D of Example 2 was also shown in Table 3.

TABLE 3

| Battery | Charge efficiency of positive electrode active material at 50° C. (%) | Discharge capacity ratio during large current discharge (%) | Average discharge voltage during large current discharge (V) | Capacity retention ratio after standing at 45° C. for 30 days (%) |
|---|---|---|---|---|
| D | 92 | 91 | 1.05 | 80 |
| G | 92 | 92 | 1.03 | 81 |
| H | 93 | 90 | 1.04 | 79 |
| I | 91 | 91 | 1.06 | 78 |
| J | 92 | 91 | 1.05 | 80 |

As can be seen from Table 3, the utilization of the positive electrode active material, the large current discharge characteristic and the self-discharge resistance of each of the alkaline storage batteries G to K of Examples 3 to 7 were substantially equal to those of the alkaline storage battery D of Example 2.

This was probably due to the following reason. That is, the alkaline storage battery in accordance with the present invention comprised: a positive electrode plate obtained by filling an active material mainly composed of a hydroxide of nickel into a porous sintered nickel substrate and then applying a manganese compound containing manganese with a valence of 2 or more on the surface of the substrate; a negative electrode plate; a separator; and an alkaline electrolyte. This battery was charged and discharged twice to convert the solid solution of the hydroxide of nickel and cobalt hydroxide as the positive electrode active material into an oxide containing either nickel or cobalt each having a valence of 2 or more. Then, this was allowed to stand at an ambient temperature of 60° C., so that the manganese hydroxide containing manganese with a valence of 2 or more, which had been applied onto the surface of the positive electrode plate of the alkaline storage battery G and had not yet been oxidized, was ionized and then oxidized by the oxide of nickel containing nickel with a valence of 2 or more on the surface of the positive electrode plate to be converted into an insoluble high-valent manganese oxide on the surface of the positive electrode plate, thereby forming a desired layer of a manganese compound.

In the case of the alkaline storage batteries of Examples 4 to 7, each of the configured batteries was charged and discharged twice to convert the hydroxide of nickel as the positive electrode active material into an oxide containing nickel with a valence of two or more, and this was further allowed to stand at an ambient temperature of 60° C., so that any one of the manganese compound containing manganese with a valence of two or more which had been applied onto the surfaces of the separator and the negative electrode plate, the manganese compound containing manganese with a valence of two or more which had been added in the negative electrode, and the manganese compound containing manganese with a valence of two or more which had been included in the separator was dissolved into the electrolyte. Then, this manganese compound migrated to the surface of the positive electrode plate and then oxidized by nickel oxide containing nickel with a valence of 2 or more on the surface of the positive electrode plate to be converted into an insoluble high-valent oxide, forming a desired layer of a manganese compound, which was considered to have improved the self-discharge resistance.

It should be noted that the same function and effect could be achieved when an alkaline storage battery was fabricated after applying manganese hydroxide to the separator onto one surface thereof opposite the negative electrode, or when a negative electrode plate containing a powder of metallic manganese in the negative electrode was used, in place the above Examples 4 to 7.

The same function and effect could also be achieved by filling an active material mainly composed of a hydroxide of nickel into a porous sintered nickel substrate and charging and discharging the substrate at least once to configure an alkaline storage battery, and allowing the configured battery to stand at an ambient temperature of 40° C. or above before charging and discharging, in place of the above Examples 4 to 7.

Industrial Applicability

As described above, it is possible to provide a nickel-metal hydride storage battery capable of preventing the formation of a minute chemical short circuit between the positive and negative electrodes while exhibiting an excellent self-discharge resistance, by forming a layer of a manganese compound containing manganese with a valence of 2 or more on the surface of the positive electrode plate in a storage battery comprising a nickel positive electrode plate in accordance with the present invention, a negative electrode plate, a separator and an alkaline electrolyte.

What is claimed is:

1. A method of producing a nickel positive electrode plate comprising the steps of:
   (1) filling an active material comprising a hydroxide of nickel into a porous nickel substrate; and
   (2) forming a layer of a manganese compound on a surface of said substrate filled with an active material;
   wherein said step (2) is a step of forming a layer of a manganese compound on a surface of said substrate by charging and discharging said substrate filled with an active material at least once, and immersing said substrate in a saturated alkaline solution containing manganese ions.

2. A method of producing a nickel positive electrode plate comprising the steps of:
   (1) filling an active material comprising a hydroxide of nickel into a porous nickel substrate; and
   (2) forming a layer of a manganese compound on a surface of said substrate filled with an active material;
   wherein said step (2) is a step of forming a layer of a manganese compound on a surface of said substrate by immersing said substrate filled with an active material in a saturated alkaline solution containing manganese ions, while applying a potential thereto.

3. The method of producing a nickel positive electrode plate in accordance with claim 2, wherein said step (2) further comprises applying a manganese compound containing manganese with a valence of 2 or more onto a surface of said substrate filled with an active material.

4. A method of producing an alkaline storage battery comprising the steps of:
   (1) causing any one of a positive electrode plate, a negative electrode plate and a separator to retain a powder of metallic manganese or a manganese compound containing manganese with a valence or 2 or more;
   (2) assembling a battery by using said positive electrode plate, said negative electrode plate, said separator and an alkaline electrolyte; and
   (3) charging and discharging a resultant battery at least once,
   wherein said step (1) is a step of applying a manganese compound containing manganese with a valence of 2 or more onto a surface of said separator.

5. A method of producing an alkaline storage battery comprising the steps of:
   (1) causing any one of a positive electrode plate, a negative electrode plate and a separator to retain a powder of metallic manganese or a manganese compound containing manganese with a valence or 2 or more;
   (2) assembling a battery by using said positive electrode plate, said negative electrode plate, said separator and an alkaline electrolyte; and
   (3) charging and discharging a resultant battery at least once,
   wherein said step (1) is a step of applying a manganese compound containing manganese with a valence of 2 or more onto a surface of said negative electrode plate.

6. A method of producing an alkaline storage battery comprising the steps of:
   (1) causing any one of a positive electrode plate, a negative electrode plate and a separator to retain a powder of metallic manganese or a manganese compound containing manganese with a valence of 2 or more;
   (2) assembling a battery by using said positive electrode plate, said negative electrode plate, said separator and an alkaline electrolyte; and
   (3) charging and discharging a resultant battery at least once,
   wherein said step (1) is a step of adding a powder of metallic manganese or a manganese compound containing manganese with a valence of 2 or more in said negative electrode plate.

7. A method of producing an alkaline storage battery comprising the steps of:
   (1) causing any one of a positive electrode plate, a negative electrode plate and a separator to retain a powder of metallic manganese or a manganese compound containing manganese with a valence of 2 or more;
   (2) assembling a battery by using said positive electrode plate, said negative electrode plate, said separator and an alkaline electrolyte; and
   (3) charging and discharging a resultant battery at least once,
   wherein said step (1) comprises a step of forming manganese hydroxide in a pore of said separator by immersing said separator in an aqueous solution of a manganese salt, followed by immersing in an aqueous alkaline solution, and another step of drying a resultant separator containing manganese hydroxide in an inert atmosphere or under a reduced pressure.

* * * * *